United States Patent
Hsieh et al.

(10) Patent No.: US 11,829,531 B2
(45) Date of Patent: Nov. 28, 2023

(54) HUMAN-COMPUTER INTERACTION METHOD AND SYSTEM AND NON-TRANSITORY COMPUTER READABLE STORAGE MEDIUM

(71) Applicant: HTC Corporation, Taoyuan (TW)

(72) Inventors: Cheng-Han Hsieh, Taoyuan (TW); Tzu-Yin Chang, Taoyuan (TW)

(73) Assignee: HTC Corporation, Taoyuan (TW)

( * ) Notice: Subject to any disclaimer, the term of this patent is extended or adjusted under 35 U.S.C. 154(b) by 0 days.

(21) Appl. No.: 17/652,481

(22) Filed: Feb. 24, 2022

(65) Prior Publication Data

US 2023/0082411 A1 Mar. 16, 2023

Related U.S. Application Data (60) Provisional application No. 63/261,109, filed on Sep. 13, 2021.

(51) Int. Cl.
*G06F 3/01* (2006.01)
*G06T 7/246* (2017.01)
*G06T 7/70* (2017.01)
*G06V 40/20* (2022.01)

(52) U.S. Cl.
CPC .............. *G06F 3/014* (2013.01); *G06T 7/248* (2017.01); *G06T 7/70* (2017.01); *G06V 40/28* (2022.01)

(58) Field of Classification Search
CPC G06F 3/014; G06T 7/248; G06T 7/70; G06V 40/28
See application file for complete search history.

(56) References Cited

U.S. PATENT DOCUMENTS

| | | | |
|---|---|---|---|
| 11,442,550 B2 * | 9/2022 | Qiu | G01S 7/417 |
| 2003/0156756 A1 * | 8/2003 | Gokturk | G06V 40/11 |
| | | | 382/190 |
| 2007/0273642 A1 * | 11/2007 | Park | G06F 3/011 |
| | | | 345/156 |
| 2011/0291926 A1 * | 12/2011 | Gokturk | G06V 40/113 |
| | | | 345/158 |

(Continued)

FOREIGN PATENT DOCUMENTS

| | | |
|---|---|---|
| CN | 112996430 A | 6/2021 |
| TW | M597960 U | 7/2020 |
| TW | 202101170 A | 1/2021 |

OTHER PUBLICATIONS

The office action of the corresponding Taiwanese application No. TW111119148 dated Mar. 30, 2023.

*Primary Examiner* — Bryan Earles
(74) *Attorney, Agent, or Firm* — CKC & Partners Co., LLC (57) ABSTRACT

The present disclosure provides a human-computer interaction method and system. The method includes following operations: by a motion sensor, sensing a hand movement to generate a movement signal; by a camera module, capturing a plurality of images of the hand movement; by at least one processor, generating a plurality of feature values according to the movement signal adjusted based on hand movement information, wherein the hand movement information is generated by analyzing the plurality of images of the hand movement; and by the at least one processor, controlling a virtual object by a first hand gesture determined by a hand gesture determination model according to the plurality of feature values.

18 Claims, 9 Drawing Sheets

(56) References Cited

U.S. PATENT DOCUMENTS

| | | | |
|---|---|---|---|
| 2012/0323521 A1* | 12/2012 | De Foras | G06F 3/0346 |
| | | | 702/141 |
| 2015/0220776 A1* | 8/2015 | Cronholm | G06T 7/248 |
| | | | 382/103 |
| 2020/0073483 A1* | 3/2020 | Berenzweig | A61B 5/316 |
| 2020/0310539 A1 | 10/2020 | Barachant et al. | |
| 2021/0181859 A1* | 6/2021 | Horowitz | G01S 3/00 |
| 2021/0232226 A1* | 7/2021 | Cipoletta | H04W 4/021 |

\* cited by examiner

HUMAN-COMPUTER INTERACTION METHOD AND SYSTEM AND NON-TRANSITORY COMPUTER READABLE STORAGE MEDIUM

CROSS-REFERENCE TO RELATED APPLICATION

This application claims priority to U.S. Provisional Application Ser. No. 63/261,109, filed on Sep. 13, 2021, which is herein incorporated by reference.

BACKGROUND

Field of Invention

This disclosure relates to a method and system, and in particular to a human-computer interaction method and system.

Description of Related Art

For achieving the hand gesture recognition, several traditional approaches are usually used. Some of the traditional approaches use the biomedical signal sensor. For example, the system may utilize a device for wearing on the arm of the user to sense EMG/MMG signal generated according to the muscle contraction, so as to recognize the hand gesture of the user.

However, the above-described traditional approaches usually require the user to do a calibration before using or to do a re-calibration during using, so as to prevent the system from having variance in recognition due to the individual difference and to increase the accuracy of recognition.

SUMMARY

An aspect of present disclosure relates to a human-computer interaction method. The method includes following operations: by a motion sensor, sensing a hand movement to generate a movement signal; by a camera module, capturing a plurality of images of the hand movement; by at least one processor, generating a plurality of feature values according to the movement signal adjusted based on hand movement information, wherein the hand movement information is generated by analyzing the plurality of images of the hand movement; and by the at least one processor, controlling a virtual object by a first hand gesture determined by a hand gesture determination model according to the plurality of feature values.

Another aspect of present disclosure relates to a human-computer interaction system. The system includes a motion sensor, a camera module and at least one processor. The motion sensor is configured to sense a hand movement to generate a movement signal. The camera module is configured to capture a plurality of images of the hand movement. The at least one processor is coupled to the motion sensor and the camera module, and is configured to: generate a plurality of feature values according to the movement signal adjusted based on hand movement information, wherein the hand movement information is generated by analyzing the plurality of images of the hand movement; and control a virtual object by a first hand gesture determined by a hand gesture determination model according to the plurality of feature values.

Another aspect of present disclosure relates to a non-transitory computer readable storage medium with a computer program to execute a human-computer interaction method, wherein the method includes following operations: by a motion sensor, sensing a hand movement to generate a movement signal; by a camera module, capturing a plurality of images of the hand movement; by at least one processor, generating a plurality of feature values according to the movement signal adjusted based on hand movement information, wherein the hand movement information is generated by analyzing the plurality of images of the hand movement; and by the at least one processor, controlling a virtual object by a first hand gesture determined by a hand gesture determination model according to the plurality of feature values.

It is to be understood that both the foregoing general description and the following detailed description are by examples, and are intended to provide further explanation of the invention as claimed.

BRIEF DESCRIPTION OF THE DRAWINGS

The present disclosure can be more fully understood by reading the following detailed description of the embodiment, with reference made to the accompanying drawings as follows.

DETAILED DESCRIPTION

The embodiments are described in detail below with reference to the appended drawings to better understand the aspects of the present application. However, the provided embodiments are not intended to limit the scope of the disclosure, and the description of the structural operation is not intended to limit the order in which they are performed. Any device that has been recombined by components and produces an equivalent function is within the scope covered by the disclosure.

As used herein, "coupled" and "connected" may be used to indicate that two or more elements physical or electrical contact with each other directly or indirectly, and may also be used to indicate that two or more elements cooperate or interact with each other.

Figure 1:
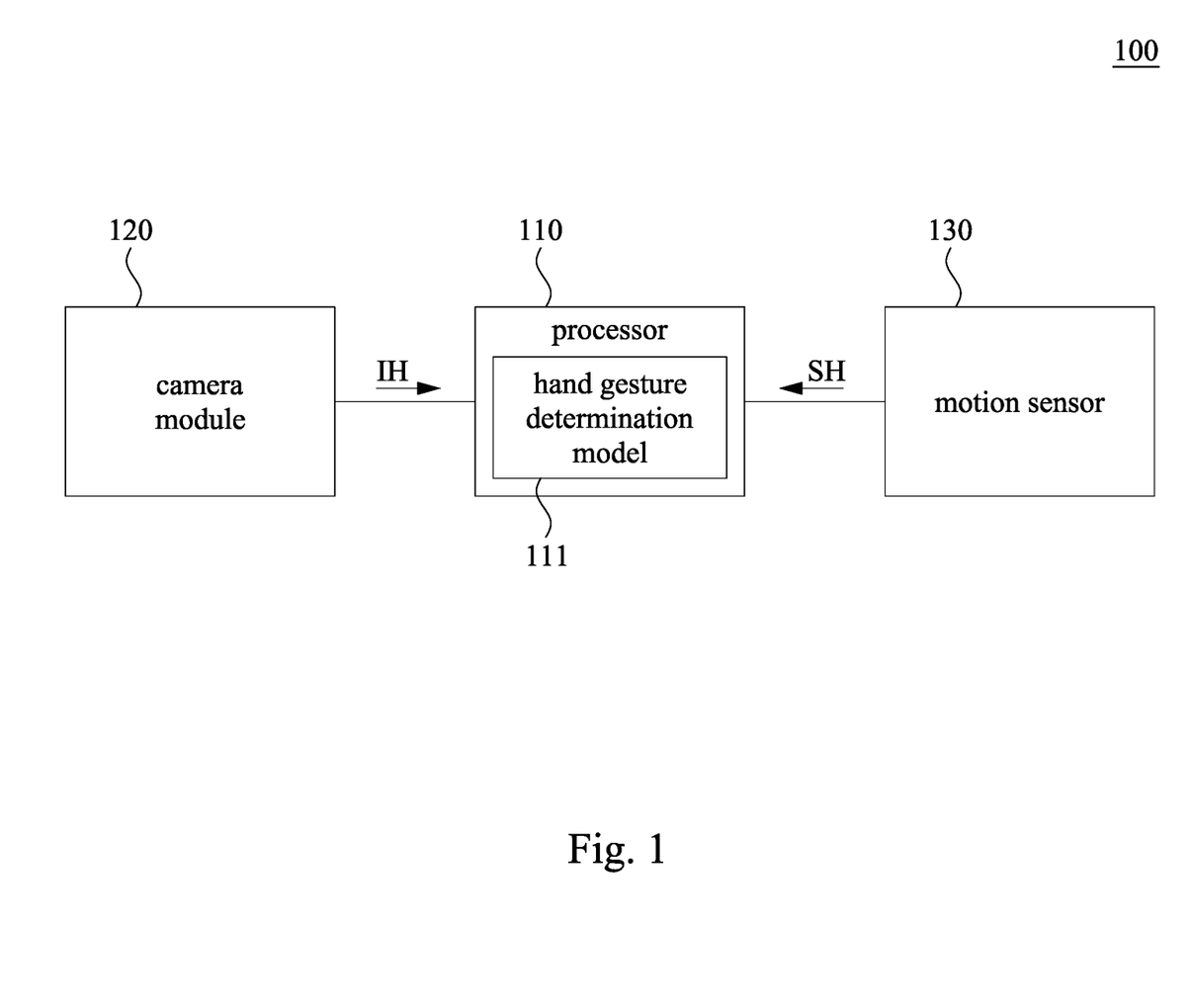
FIG. 1 is a block diagram of a human-computer interaction system in accordance with some embodiments of the present disclosure.

Referring to FIG. 1, FIG. 1 is a block diagram of a human-computer interaction system 100 in accordance with some embodiments of the present disclosure. In some embodiments, the human-computer interaction system 100 includes a processor 110, a camera module 120 and a motion sensor 130. As shown in FIG. 1, the processor 110 is electrically or communicatively coupled to the camera module 120 and the motion sensor 130.

Figure 2:
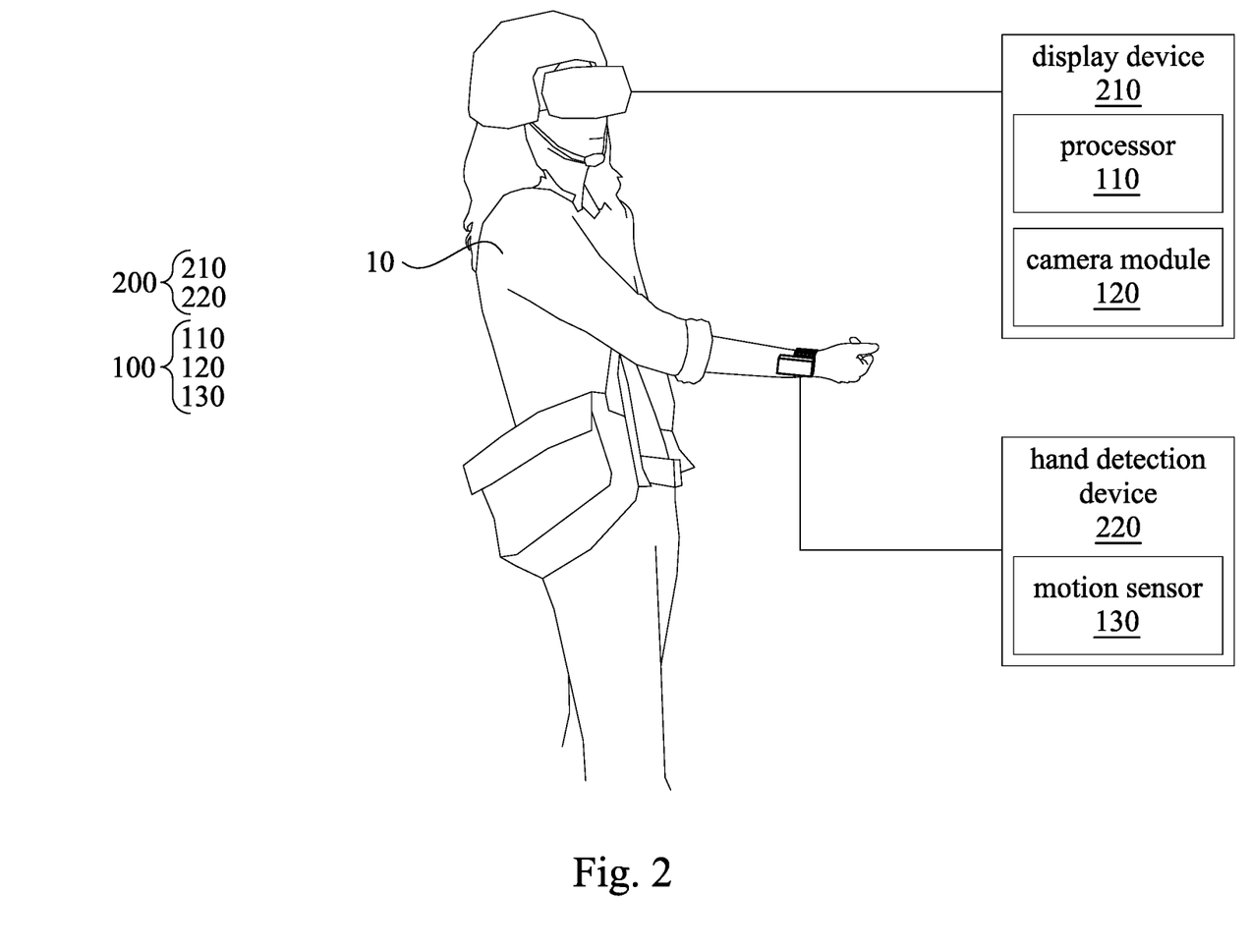
FIG. 2 is a schematic diagram of a multimedia system of a user in accordance with some embodiments of the present disclosure.

Referring to FIG. 2, FIG. 2 is a schematic diagram of a multimedia system 200 of a user 10 including a display device 210 and a hand detection device 220 in accordance with some embodiments of the present disclosure. As shown in FIG. 2, the user 10 mounts the display device 210 on his/her head, and wears the hand detection device 220 on his/her arm (or wrist). The display device 210 is configured to display a virtual environment (not shown) including a virtual object to the user 10. In some embodiments, the virtual environment may be a completely immersed virtual reality (VR) environment, an augmented reality (AR) environment augmenting the real-world environment perceived by the user with the virtual object or a mixed reality (MR) environment merging multiple elements of both AR and VR to enable the virtual object co-existing and interacting with real objects. In some embodiments, the display device 210 may be a head-mounted device (HMD). Through the hand detection device 220 on the arm of the user 10, the user 10 can control the virtual object displayed by the display device 210 by utilizing his/her hand to perform various hand gestures (e.g., pinch, grasp, or fist).

In the embodiment of FIG. 2, the processor 110 and the camera module 120 of the human-computer interaction system 100 are integrated into the display device 210, and the motion sensor 130 of the human-computer interaction system 100 is integrated into the hand detection device 220. When the user 10 performs a hand gesture, the motion sensor 130 is configured to sense a hand movement of the user 10 to generate a movement signal SH (as shown in FIG. 1). At the same time, the camera module 120 is configured to capture a plurality of images IH (as shown in FIG. 1) of the hand movement of the user 10. As shown in FIG. 1, the processor 110 is configured to receive the movement signal SH outputted by the motion sensor 130 and the images IH outputted by the camera module 120 for processing. After processing the movement signal SH and the images IH, the processor 110 can determine the hand gesture of the user 10 by utilizing a hand gesture determination model 111. It can be appreciated that the hand gesture determination model 111 may be an object detection model that has been trained to determine the type of the hand gesture, thereby having a weight matrix. The hand gesture determination model 111 is configured to output a determination result of the hand gesture according to an input (which may be generated by processing the movement signal SH and the images IH) and the weight matrix. The operation of the human-computer interaction system 100 would be further described in detail later with reference to FIG. 2.

It can be appreciated that the number of the hand detection device 220 is not limited to be those shown in FIG. 2 (i.e., one). In other embodiments, the user 10 may wear the hand detection devices 220 of FIG. 2 on his/her right hand, and wear another hand detection device on his/her left hand simultaneously.

In some embodiments, the processor 110 is implemented by one or more central processing unit (CPU), application-specific integrated circuit (ASIC), microprocessor, system on a Chip (SoC) or other suitable processing units. Although the processor 110 is integrated into the display device 210 in the embodiment of FIG. 2, the present disclosure is not limited thereto. It can be appreciated that the processor 110 can be independent from the display device 210 and can transmit/receive the images IH, the movement signal SH and the determination result through network, and the display device 210 may include other processor(s) (not shown) configured to control and display the virtual object according to the determination result. In some embodiment, the processor 110 may be disposed in a personal computer, a game console or an arcade.

In some embodiments, the motion sensor 130 is implemented by inertial measurement unit based (IMU-based) sensors, such as gyroscopes and accelerometers. However, the present disclosure is not limited herein. In other embodiments, the motion sensor 130 can be implemented by the IMU-based sensors, electromyogram based (EMG-based) sensors, mechanomyogram based (MMG-based) sensors, and/or a combination thereof.

Figure 3:
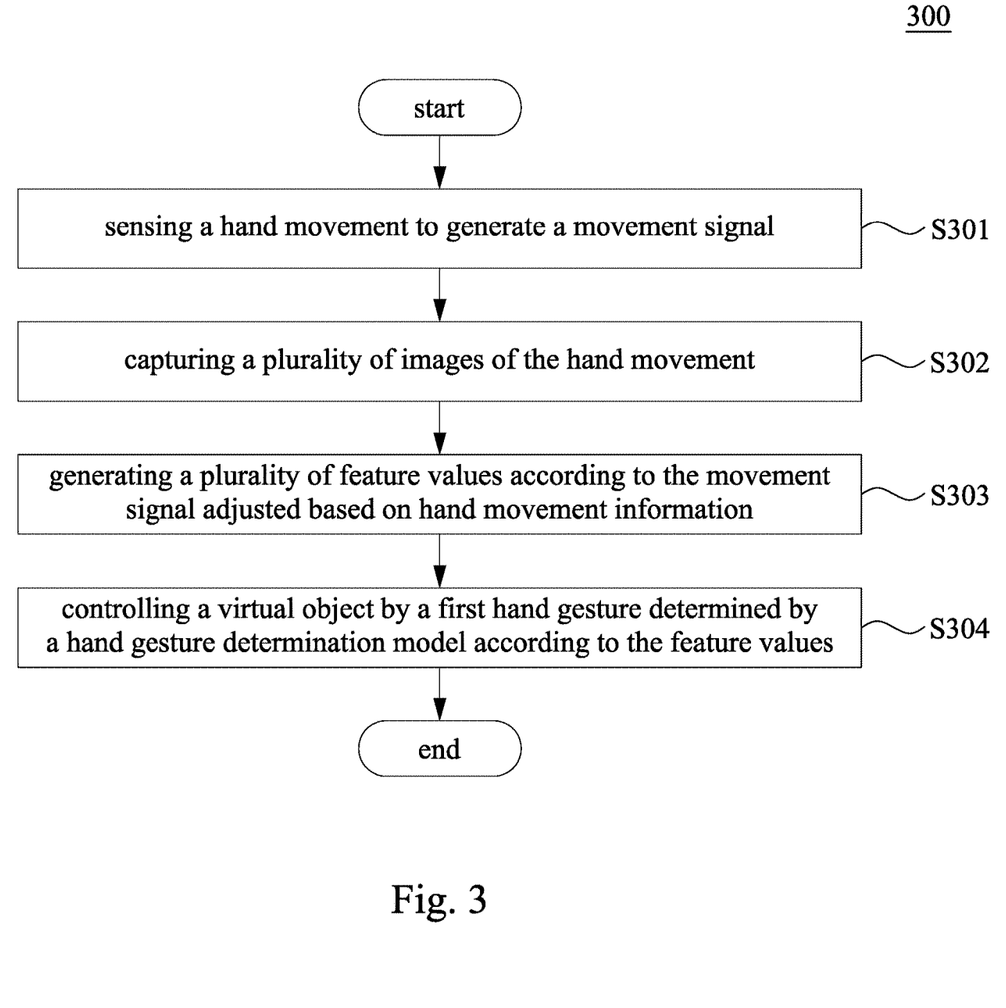
FIG. 3 is a flow diagram of a human-computer interaction method in accordance with some embodiments of the present disclosure.
Figure 4A:
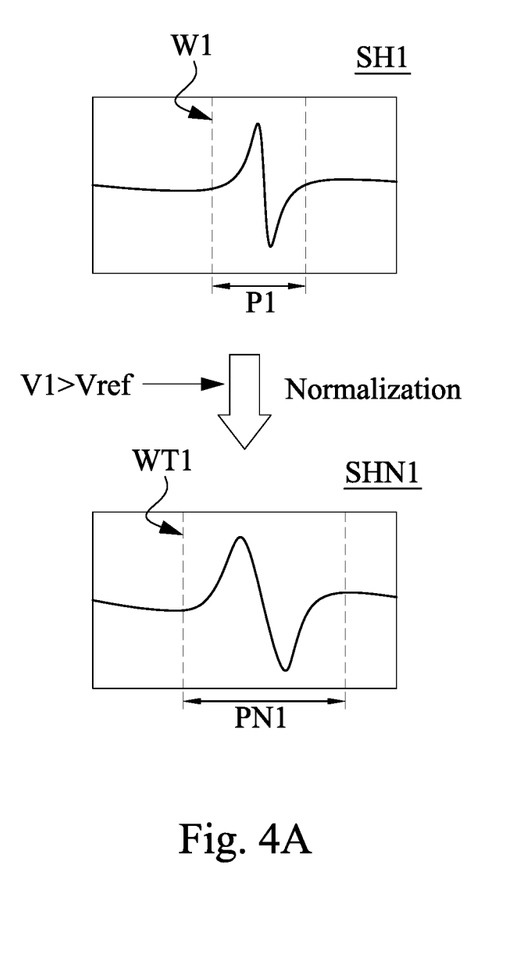
FIG. 4A is a schematic diagram of a movement signal and a normalized movement signal generated based on a hand gesture performed by a first user in accordance with some embodiments of the present disclosure.
Figure 4B:
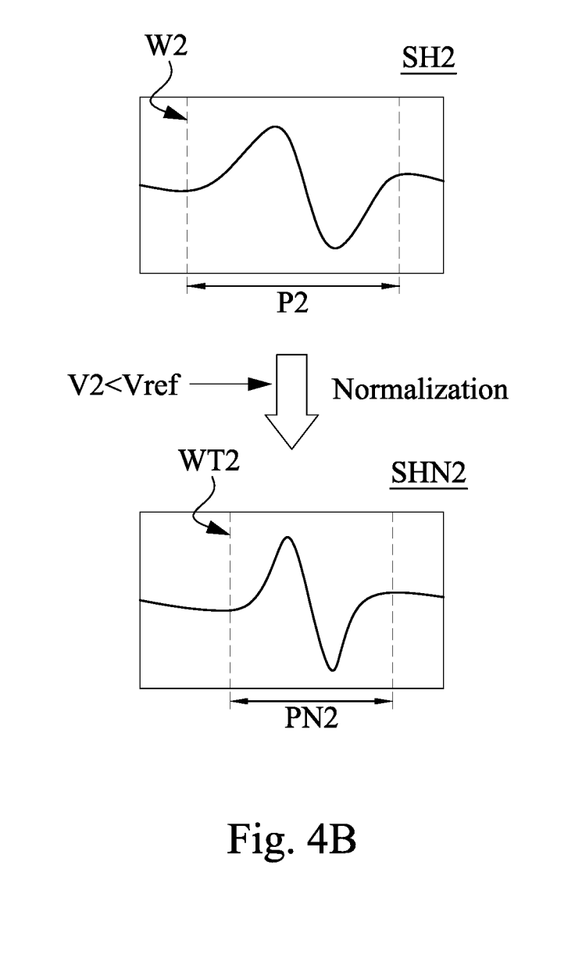
FIG. 4B is a schematic diagram of another movement signal and another normalized movement signal generated based on the hand gesture performed by of a second user in accordance with some embodiments of the present disclosure.

Referring to FIG. 3, FIG. 3 is a flow diagram of a human-computer interaction method 300 in accordance with some embodiments of the present disclosure. The human-computer interaction method 300 can be performed by the human-computer interaction system 100 of FIG. 1 or 2. However, the present disclosure should not be limited thereto. As shown in FIG. 3, the human-computer interaction method 300 includes operations S301-S304. Operations S301-S304 would be described in detail below with reference to FIGS. 4A-4B and 5. FIG. 4A is a schematic diagram of a movement signal and a normalized movement signal generated based on a hand gesture performed by a first user in accordance with some embodiments of the present disclosure. FIG. 4B is a schematic diagram of another movement signal and another normalized movement signal generated based on the hand gesture performed by of a second user in accordance with some embodiments of the present disclosure. In some embodiments, the first user may be the user 10 of the multimedia system 200 of FIG. 2, and the second user may be another user using the multimedia system 200 before or after the user 10.

Reference is first made to FIGS. 3 and 4A. In operation S301, a hand movement is sensed to generate a movement signal. In the embodiment of FIG. 4A, the first user (e.g., the user 10 of FIG. 2) uses his/her hand to pinch (i.e., performs the hand gesture), and the motion sensor 130 senses the hand movement of the first user to generate a movement signal SH1. As shown in FIG. 4A, the movement signal SH1 has a characteristic waveform W1 (which is corresponding to the hand movement of the first user) having a time period P1.

In operation S302, a plurality of images IH of the hand movement is captured. In the embodiment of FIG. 4A, the camera device 120 would capture multiple images IH of the hand movement of the first user while the first user uses his/her hand to pinch.

In operation S303, a plurality of feature values is generated according to the movement signal adjusted based on hand movement information. The hand movement information is generated by analyzing the images IH of the hand movement. In the embodiment of FIG. 4A, after receiving the images IH of the hand movement of the first user from the camera module 120, the processor 110 first analyzes the images IH by, for example, utilizing the technology of CV-based (computer vision based) hand tracking and recognition. In particular, the processor 110 detects multiple hand landmarks (e.g., palm, thumb, fingers, joints, wrist, etc.) in each image, to generate joint data (i.e., all joint positions of hand in each image) at least. It can be appreciated that the processor 110 can generate velocity data according to the joint data. For example, in the embodiment of FIG. 4A, the processor 110 calculates a speed value V1 (at which the first user pinches) based on a difference between two joint position distributions in two of the images IH (e.g., a first image that the thumb at a maximum distance from the index finger, and a last image that the thumb is in contact with the index finger) and a time interval between the two of the images IH. It can be appreciated that the processor 110 can further generate angle data according to the joint data. For example, the processor 110 calculates an angle value between the thumb and the index finger in one image based on a joint position distribution of the thumb and the index finger. In brief, the hand movement information generated from the images IH of the hand movement at least includes the joint data, the velocity data and the angle data.

After generating the hand movement information, the processor 110 would adjust the movement signal according to the hand movement information. In particular, the processor 110 performs normalization on the movement signal according to the hand movement information. In the embodiment of FIG. 4A, the processor 110 compares the speed value V1 with a reference value Vref, and determines that the speed value V1 is greater than the reference value Vref, which means that the first user pinches at a speed faster than a reference speed. Accordingly, the processor 110 scales the characteristic waveform W1 of the movement signal SH1 on a time dimension (i.e., along a horizontal axis of FIG. 4A), to generate a normalized movement signal SHN1 having a characteristic waveform WT1 with a time period PN1 longer than the time period P1. In other words, the characteristic waveform W1 (i.e., the second waveform) of the movement signal SH1 is adjusted to the characteristic waveform WT1 (i.e., the first waveform) of the normalized movement signal SHN1. The characteristic waveform WT1 of the normalized movement signal SHN1 is substantially the same as a target waveform. It can be appreciated that the target waveform can be a typical waveform which represents the hand gesture of "pinch", and can be pre-stored in a memory (not shown) of the human-computer interaction system 100.

Thereafter, the processor 110 extracts the plurality of feature values from the normalized movement signal SHN1. For example, in the embodiment of FIG. 4A, the processor 110 extracts multiple feature values from the normalized movement signal SHN1 by utilizing a wavelet transformation.

Through the aforementioned normalization operation, the human-computer interaction system 100 is capable of precisely determining a same hand gesture of different users, even if the movement signals of the different users may have different characteristic waveforms. Reference is made to FIGS. 3 and 4B for further discussion. In the embodiment of FIG. 4B, the second user also uses his/her hand to pinch as the first user, and the motion sensor 130 senses the hand movement of the second user to generate a movement signal SH2 (i.e., operation S301). As shown in FIG. 4B, the movement signal SH2 has a characteristic waveform W2 (which is corresponding to the hand movement of the second user) having a time period P2. The time period P2 is substantially longer than the time period P1. It can be appreciated that the movement signal SH1 and the movement signal SH2 are difference from each other due to an individual difference between the first user and the second user. For example, the first user pinches faster than the second user. In the embodiment of FIG. 4B, the camera device 120 would capture multiple images IH of the hand movement of the second user while the second user uses his/her hand to pinch (i.e., operation S302). As discussed above with respect to FIG. 4A, in the embodiment of FIG. 4B, the processor 110 analyzes the images IH of the hand movement of the second user to generate the hand movement information (e.g., a speed value V2 at which the second user pinches). The processor 110 performs the normalization on the movement signal SH2 according to a determination result that the speed value V2 is smaller than the reference value Vref, so as to generate a normalized movement signal SHN2 having a characteristic waveform WT2 with a time period PN2 shorter than the time period P2. It can be appreciated that the characteristic waveform WT2 of the normalized movement signal SHN2 is also substantially the same as the target waveform. In addition, the processor 110 extracts multiple feature values from the normalized movement signal SHN2 by, for example, utilizing the wavelet transformation (i.e., operation S303).

Referring to FIGS. 4A-4B again, the characteristic waveform WT1 and the characteristic waveform WT2 are substantially the same, and the time period PN1 and the time period PN2 are substantially the same. In other words, the individual difference between the first user and the second user would be eliminated after the movement signal SH1 and the movement signal SH2 are both normalized.

Figure 5:
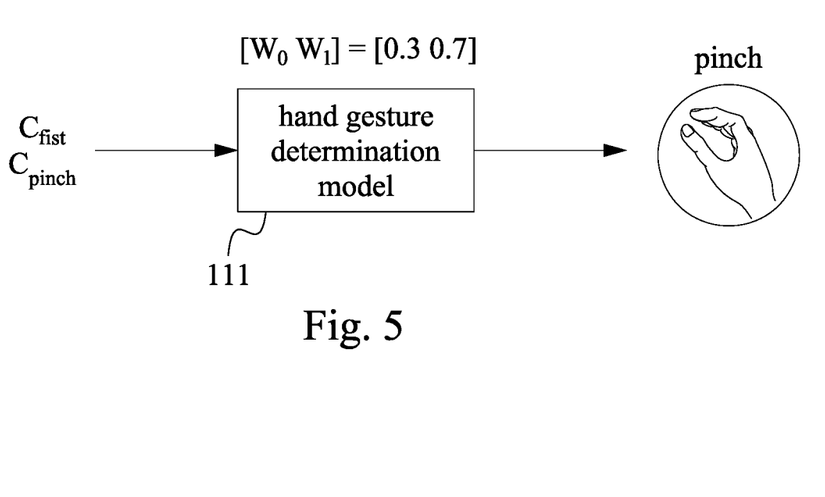
FIG. 5 is a schematic diagram of the hand gesture determination model in accordance with some embodiments of the present disclosure.

In operation S304, a virtual object is controlled by a first hand gesture determined by the hand gesture determination model 111 according to the feature values obtained in operation S303. The determination of the first hand gesture would be described in detail with reference to FIG. 5. Referring to FIG. 5, FIG. 5 is a schematic diagram of the hand gesture determination model 111 in accordance with some embodiments of the present disclosure. As shown in FIG. 5, it is assumed that a first feature value $C_{fist}$ and a second feature value $C_{pinch}$ are generated according to the normalized movement signal SHN1 of FIG. 4A, and that the hand gesture determination model 111 has a weight matrix including two weight values $W_0$ and $W_1$. It can be appreciated that the first feature value $C_{fist}$ is corresponding to the hand gesture of "fist", and the second feature value $C_{pinch}$ is corresponding to the hand gesture of "pinch". After the first and the second feature values $C_{fist}$ and $C_{pinch}$ are inputted into the hand gesture determination model 111, the hand gesture determination model 111 multiplies the first feature value $C_{fist}$ (e.g., 100) by the weight values $W_0$ (e.g., 0.3) and multiplies the second feature values $C_{pinch}$ (e.g., 80) by the weight values $W_1$ (e.g., 0.7), so as to calculate two scores. For example, the first score is 30, and the second score is 56. Since the second score is greater than the first score and is associated with the second feature values $C_{pinch}$, the hand gesture determination model 111 would output the hand gesture of "pinch" (i.e., the first hand gesture) as an answer. The processor 110 would then control the virtual object (which may be displayed by the display device 210 of FIG. 2) based on the output of the hand gesture determination model 111.

It can be appreciated that if the feature values generated according to the normalized movement signal SHN2 of FIG. 4B are inputted into the hand gesture determination model 111, the hand gesture determination model 111 would also output the hand gesture of "pinch" as the answer.

Figure 6A:
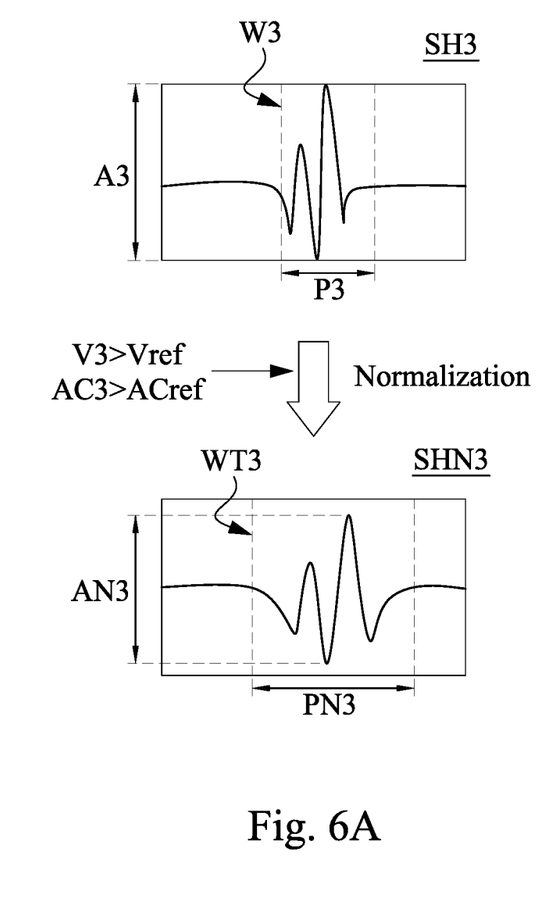
FIG. 6A is a schematic diagram of a movement signal and a normalized movement signal generated based on another hand gesture performed by the first user in accordance with some embodiments of the present disclosure.
Figure 6B:
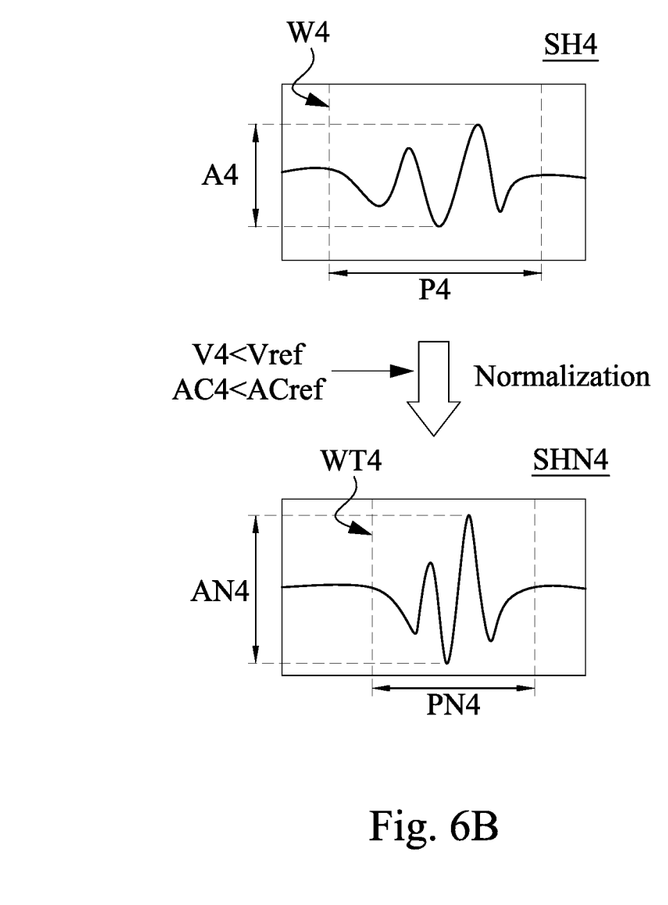
FIG. 6B is a schematic diagram of another movement signal and another normalized movement signal generated based on said another hand gesture performed by of the second user in accordance with some embodiments of the present disclosure.

In the above embodiments, the processor 110 scales the movement signals SH1 and SH2 on the time dimension only, however, the present disclosure is not limited herein. Referring to FIGS. 6A-6B, FIG. 6A is a schematic diagram of a movement signal and a normalized movement signal generated based on another hand gesture (different from those of FIGS. 4A-4B) performed by the first user in accordance with some embodiments of the present disclosure. FIG. 6B is a schematic diagram of a movement signal and a normalized movement signal generated based on said another hand gesture performed by of the second user in accordance with some embodiments of the present disclosure. In the embodiments of FIGS. 6A-6B, both the first user and the second user clench his/her fist (i.e., perform the hand gesture), and the motion sensor 130 generates a movement signal SH3 and a movement signal SH4 respectively. The movement signal SH3 has a characteristic waveform W3 with an amplitude range A3 and a time period P3, and the movement signal SH4 has a characteristic waveform W4 with an amplitude range A4 and a time period P4 (different from the time period P3). It can be appreciated that the amplitude range A3 is different from the amplitude range A4 due to an individual force difference between the first user and the second user.

As above descriptions, in the embodiment of FIG. 6A, the processor 110 would analyze the images IH of the hand movement of the first user received from the camera module 120, to calculate a speed value V3 (i.e., the velocity data). For eliminating the individual force difference between the first user and the second user, the processor 110 can further generate acceleration data according to the velocity data, to estimate the force of hand movement. For example, the processor 110 calculates an acceleration value AC3 (i.e., the acceleration data) by dividing a difference between two speed values by a time interval between the two speed values. Next, the processor 110 determines that the speed value V3 is greater than the reference value Vref and that the acceleration value AC3 is greater than a corresponding reference value ACref, which means that the first user clenches his/her fist at a higher speed and with a larger force in comparison with average. As shown in FIG. 6A, the processor 110 scales the characteristic waveform W3 of the movement signal SH3 on both a time dimension (i.e., along a horizontal axis of FIG. 6A) and an amplitude dimension (i.e., along a vertical axis of FIG. 6A) according to the hand movement information (i.e., the speed value V3, the acceleration value AC3, etc.), so as to generate a normalized movement signal SHN3 having a characteristic waveform WT3 with an amplitude range AN3 and a time period PN3.

In the embodiment of FIG. 6B, the processor 110 analyzes the images IH of the hand movement of the second user received from the camera module 120, to calculate at least a speed value V4 and an acceleration value AC4 (i.e., the hand movement information). Next, the processor 110 determines that the speed value V4 is smaller than the reference value Vref and that the acceleration value AC4 is smaller than the reference value ACref, which means that the second user clenches his/her fist at a lower speed and with a smaller force in comparison with average. As shown in FIG. 6B, the processor 110 scales the characteristic waveform W4 of the movement signal SH4 on both the time dimension and the amplitude dimension according to the hand movement information, so as to generate a normalized movement signal SHN4 having a characteristic waveform WT4 with an amplitude range AN4 and a time period PN4. It can be appreciated that both the characteristic waveform WT3 and characteristic waveform WT4 are substantially the same as a target waveform (which may be a typical waveform representing the hand gesture of "fist"). Other arrangements of the embodiments of FIGS. 6A-6B are similar to those of FIGS. 4A-4B, and therefore the descriptions thereof are omitted herein.

In the above embodiments, the normalized movement signal (e.g., SHN1 of FIG. 4A) is generated by adjusting the movement signal (e.g., SH1 of FIG. 4A), however, the present disclosure is not limited herein. In other embodiments, the processor 110 has generated the hand movement information according to the multiple images IH outputted from the camera module 120, but has not received the movement signal from the motion sensor 130 (or the motion sensor 130 has not generated the movement signal yet). Accordingly, the processor 110 adjusts a sampling setting of the motion sensor 130 according to the hand movement information, so that the motion sensor 130 generates the normalized movement signal (or a movement signal having a characteristic waveform substantially the same as the target waveform) directly.

Figure 7:
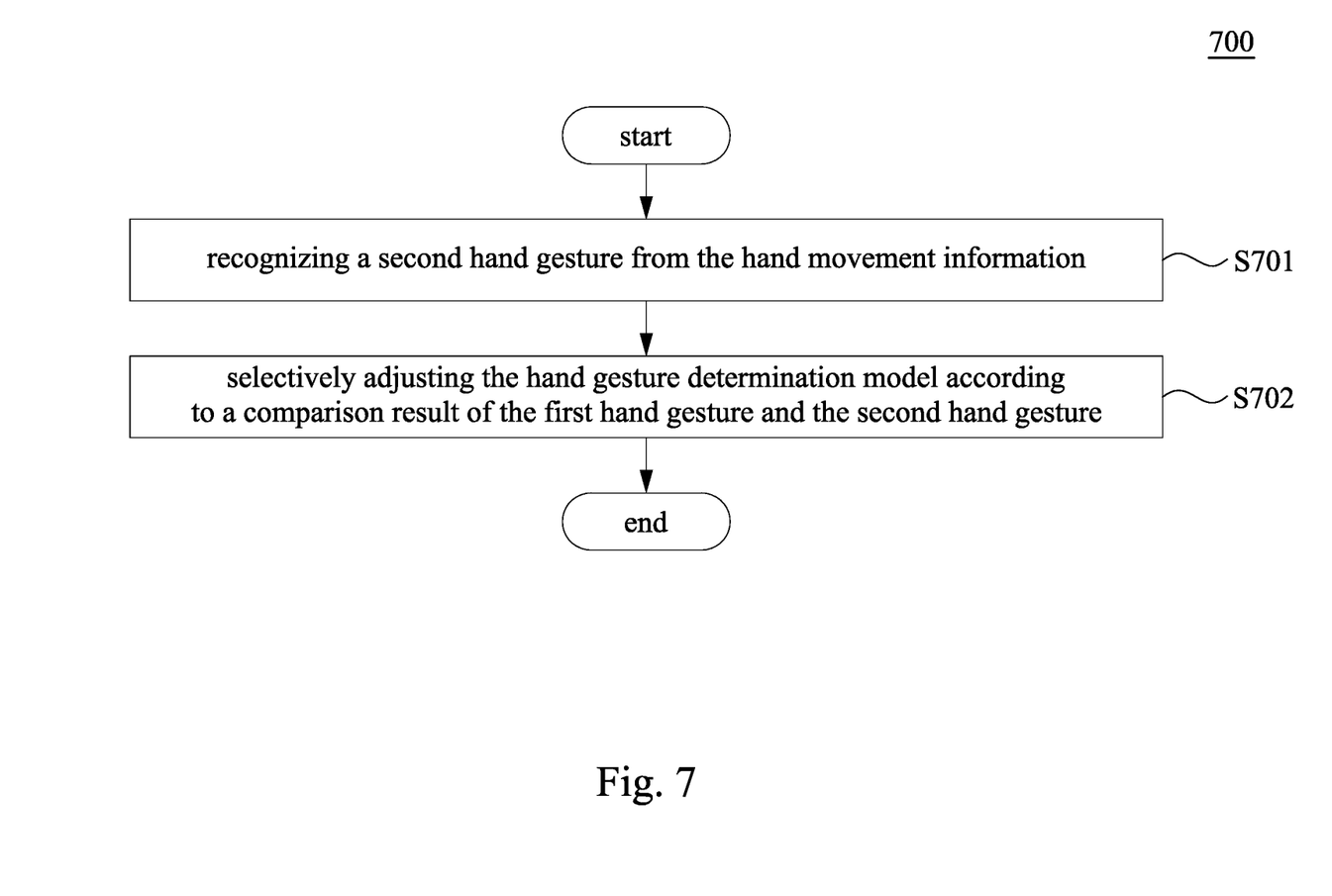
FIG. 7 is a flow diagram of a method for optimizing the hand gesture determination model in accordance with some embodiments of the present disclosure.

In some practical applications, the hand gesture determination model 111 may output incorrect answer. For example, the user uses his/her hand to pinch, however, the hand gesture determination model outputs the hand gesture of "fist" due to non-optimized weight matrix, which results in incorrect control of the virtual object. Accordingly, the present disclosure further provides a method for optimizing the hand gesture determination model 111. Referring to FIG. 7, FIG. 7 is a flow diagram of a method 700 in accordance with some embodiments of the present disclosure. The method 700 includes operations S701-S702.

In operation S701, in addition to the first hand gesture outputted by the hand gesture determination model 111 based on the output of the motion sensor 130, a second hand gesture is recognized from the hand movement information generated by analyzing the images IH of the hand movement. For example, the processor 110 can infer the second hand gesture based on a distribution of the hand landmarks. It can be appreciated that the hand movement information can be generated from the images IH captured by the camera module 120 by means similar to those described in operation S303 above.

Figure 8A:
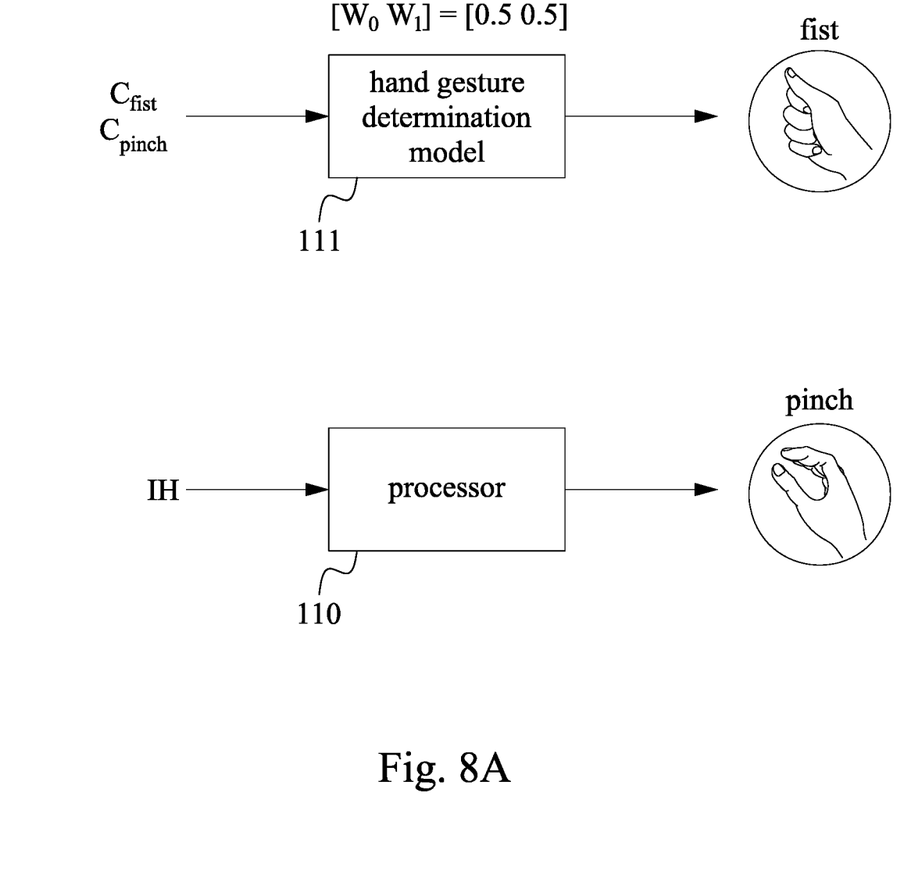
FIG. 8A is a schematic diagram of the output of the hand gesture determination model and the recognition result of the processor based on the images captured by the camera module in accordance with some embodiments of the present disclosure.

In operation S702, the hand gesture determination model is selectively adjusted according to a comparison result of the first hand gesture and the second hand gesture. In some embodiments, the first hand gesture determined by the hand gesture determination model 111 in operation S304 may be different from the second hand gesture determined by analyzing the hand movement information in operation S701. Referring to FIG. 8A, FIG. 8A is a schematic diagram of the output of the hand gesture determination model 111 and the recognition result of the processor 110 based on the images IH captured by the camera module 120. In the embodiment of FIG. 8A, the user pinches. The hand gesture determination model 111, which has a first weight matrix currently, outputs the hand gesture of "fist" (i.e., the first hand gesture).

As shown in FIG. 8A, the first weight matrix includes two weight values $W_0$ (e.g., 0.5) and $W_1$ (e.g., 0.5). The processor 110 recognizes the hand gesture of the user as the hand gesture of "pinches" (i.e., the second hand gesture) based on the analyzation to the images IH. In the situation that the hand gesture outputted by the hand gesture determination model 111 is different from the hand gesture recognized by the processor 110 based on the analyzation to the images IH, the human-computer interaction system 100 is preset to regard the hand gesture recognized by the processor 110 based on the analyzation to the images IH as a correct answer. Accordingly, the processor 110 would adjust the hand gesture determination model 111 according to the hand gesture recognized by the processor 110 based on the analyzation to the images IH, so that that the next first hand gesture outputted by the adjusted hand gesture determination model 111 would be the same as the second hand gesture.

Figure 8B:
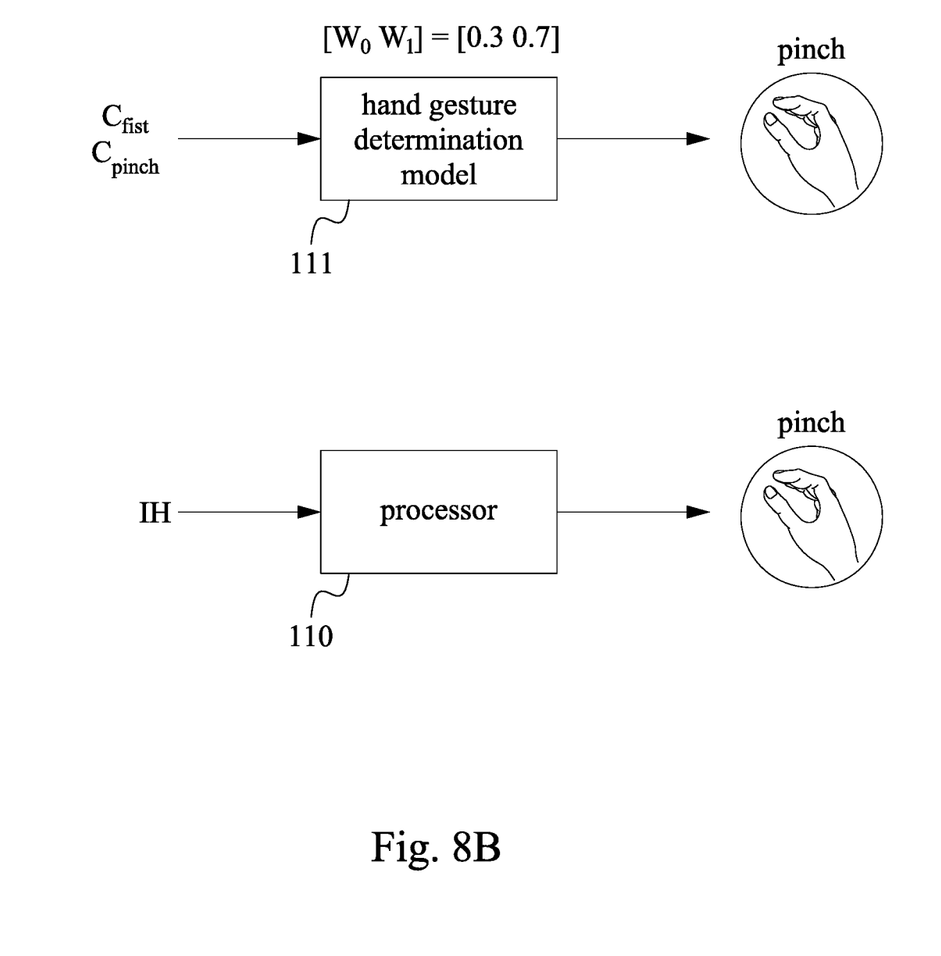
FIG. 8B is a schematic diagram of the output of the adjusted hand gesture determination model and the recognition result of the processor based on the images captured

Referring to FIG. 8B, FIG. 8B is a schematic diagram of the output of the adjusted hand gesture determination model 111 and the recognition result of the processor 110 based on the images IH captured by the camera module 120. In the embodiment of FIG. 8A, the processor 110 updates the first weight matrix (e.g., [0.5 0.5] shown in FIG. 8A) of the hand gesture determination model 111 to a second weight matrix (e.g., [0.3 0.7] shown in FIG. 8B), so as to optimize the hand gesture determination model 111. In particular, the second weight matrix can be generated by adjusting the first weight matrix according to a difference between the first hand gesture and the second hand gesture. As shown in FIGS. 8A-8B, the processor 110 decreases the weight value $W_0$ from 0.5 to 0.3, and increases the weight value $W_1$ from 0.5 to 0.7. In other words, the second weight matrix includes the two weight values $W_0$ (e.g., 0.3) and $W_1$ (e.g., 0.7) that are optimized and are different from those in the first weight matrix. After being optimized to have the second weight matrix, the hand gesture determination model 111 would output the correct hand gesture of "pinch" (i.e., the third hand gesture) though the first and the second feature values $C_{fist}$ (e.g., 100) and $C_{pinch}$ (e.g., 80) of FIG. 8B, which are the same with those of FIG. 8A.

In sum, the system and method provided by the present disclosure utilize the hand movement information generated based on the images IH captured by the camera module 120 to adjust/calibrate the movement signal generated by the motion sensor 130, so as to eliminate the individual difference. Furthermore, the system and method of the present disclosure further utilize the hand movement information to optimize the hand gesture determination model, so as to ensure the correct recognition of hand gesture. In such way, when using the system and method of the present disclosure, the user is not required to experience the calibration before using or the re-calibration during the operation.

The disclosed methods, may take the form of a program code (i.e., executable instructions) embodied in tangible media, such as floppy diskettes, CD-ROMS, hard drives, or any other machine-readable storage medium, wherein, when the program code is loaded into and executed by a machine, such as a computer, the machine thereby becomes an apparatus for practicing the methods. The methods may also be embodied in the form of a program code transmitted over some transmission medium, such as electrical wiring or cabling, through fiber optics, or via any other form of transmission, wherein, when the program code is received and loaded into and executed by a machine, such as a computer, the machine becomes an apparatus for practicing the disclosed methods. When implemented on a general-purpose processor, the program code combines with the at least one processor to provide a unique apparatus that operates analogously to application specific logic circuits.

Although the present disclosure has been described in considerable detail with reference to certain embodiments thereof, other embodiments are possible. Therefore, the spirit and scope of the appended claims should not be limited to the description of the embodiments contained herein. It will be apparent to those skilled in the art that various modifications and variations can be made to the structure of the present disclosure without departing from the scope or spirit of the invention. In view of the foregoing, it is intended that the present invention cover modifications and variations of this invention provided they fall within the scope of the following claims.

What is claimed is:

1. A human-computer interaction method, comprising:
   by a motion sensor, sensing a hand movement to generate a movement signal;
   by a camera module, capturing a plurality of images of the hand movement;
   by at least one processor, generating a plurality of feature values according to the movement signal adjusted based on hand movement information, wherein the hand movement information is generated by analyzing the plurality of images of the hand movement; and
   by the at least one processor, controlling a virtual object by a first hand gesture determined by a hand gesture determination model according to the plurality of feature values;
   wherein generating the plurality of feature values comprises:
   by the at least one processor, comparing a speed value of the hand movement information with a reference value, and scaling a characteristic waveform of the movement signal on a time dimension according to a comparison result of the speed value and the reference value, to generate a normalized movement signal; and
   by the at least one processor, extracting the plurality of feature values from the normalized movement signal.

2. The human-computer interaction method of claim 1, wherein generating the plurality of feature values further comprises:
   by the at least one processor, comparing an acceleration value of the hand movement information with another reference value, and scaling the characteristic waveform of the movement signal on an amplitude dimension according to a comparison result of the acceleration value and the another reference value.

3. The human-computer interaction method of claim 1, wherein if the movement signal is not generated by the motion sensor yet, the human-computer interaction method further comprises:
   by the at least one processor, adjusting a sampling setting of the motion sensor, so that the motion sensor generates the normalized movement signal.

4. The human-computer interaction method of claim 1, wherein the hand movement information comprises joint data, velocity data and angle data.

5. The human-computer interaction method of claim 4, wherein the velocity data and the angle data are calculated according to the joint data.

6. The human-computer interaction method of claim 1, further comprising:
   by the at least one processor, optimizing the hand gesture determination model according to the first hand gesture and the hand movement information.

7. The human-computer interaction method of claim 6, wherein optimizing the hand gesture determination model comprises:
by the at least one processor, recognizing a second hand gesture from the hand movement information; and
by the at least one processor, selectively adjusting the hand gesture determination model according to a comparison result of the first hand gesture and the second hand gesture.

8. The human-computer interaction method of claim 7, wherein if the first hand gesture is different from the second hand gesture and a first weight matrix is currently applied to the hand gesture determination model, the method further comprises:
by the at least one processor, applying a second weight matrix to the hand gesture determination model, wherein the second weight matrix is generated by adjusting the first weight matrix according to a difference between the first hand gesture and the second hand gesture,
wherein if a third hand gesture is determined by applying the plurality of feature values to the hand gesture determination model with the second weight matrix, the third hand gesture is same as the second hand gesture.

9. The human-computer interaction method of claim 1, wherein the motion sensor is an inertial measurement unit based, electromyogram based, and/or mechanomyogram based sensor.

10. A human-computer interaction system, comprising:
a motion sensor configured to sense a hand movement to generate a movement signal;
a camera module configured to capture a plurality of images of the hand movement; and
at least one processor coupled to the motion sensor and the camera module, and configured to:
generate a plurality of feature values according to the movement signal adjusted based on hand movement information, wherein the hand movement information is generated by analyzing the plurality of images of the hand movement; and
control a virtual object by a first hand gesture determined by a hand gesture determination model according to the plurality of feature values;
wherein the at least one processor is further configured to:
compare a speed value of the hand movement information with a reference value, and scale a characteristic waveform of the movement signal on a time dimension according to a comparison result of the speed value and the reference value, to generate a normalized movement signal; and
extract the plurality of feature values from the normalized movement signal.

11. The human-computer interaction system of claim 10, wherein the at least one processor is further configured to:
compare an acceleration value of the hand movement information with another reference value, and scale the characteristic waveform of the movement signal on an amplitude dimension according to a comparison result of the acceleration value and the another reference value.

12. The human-computer interaction system of claim 10, wherein if the movement signal is not generated by the motion sensor yet, the at least one processor is further configured to:
adjust a sampling setting of the motion sensor, so that the motion sensor generates the normalized movement signal.

13. The human-computer interaction system of claim 10, wherein the hand movement information comprises joint data, velocity data and angle data, and the velocity data and the angle data are calculated according to the joint data.

14. The human-computer interaction system of claim 10, wherein the at least one processor is further configured to:
optimize the hand gesture determination model according to the first hand gesture and the hand movement information.

15. The human-computer interaction system of claim 14, wherein the at least one processor is further configured to:
recognize a second hand gesture from the hand movement information; and
selectively adjust the hand gesture determination model according to a comparison result of the first hand gesture and the second hand gesture.

16. The human-computer interaction system of claim 15, wherein if the first hand gesture is different from the second hand gesture and a first weight matrix is currently applied to the hand gesture determination model, the at least one processor is further configured to:
apply a second weight matrix to the hand gesture determination model, wherein the second weight matrix is generated by adjusting the first weight matrix according to a difference between the first hand gesture and the second hand gesture,
wherein if a third hand gesture is determined by applying the plurality of feature values to the hand gesture determination model with the second weight matrix, the third hand gesture is same as the second hand gesture.

17. The human-computer interaction system of claim 10, wherein the motion sensor is an inertial measurement unit based, electromyogram based, and/or mechanomyogram based sensor.

18. A non-transitory computer readable storage medium with a computer program to execute a human-computer interaction method, wherein the method comprises:
by a motion sensor, sensing a hand movement to generate a movement signal;
by a camera module, capturing a plurality of images of the hand movement;
by at least one processor, generating a plurality of feature values according to the movement signal adjusted based on hand movement information, wherein the hand movement information is generated by analyzing the plurality of images of the hand movement; and
by the at least one processor, controlling a virtual object by a first hand gesture determined by a hand gesture determination model according to the plurality of feature values;
wherein generating the plurality of feature values comprises:
by the at least one processor, comparing a speed value of the hand movement information with a reference value, and scaling a characteristic waveform of the movement signal on a time dimension according to a comparison result of the speed value and the reference value, to generate a normalized movement signal; and
by the at least one processor, extracting the plurality of feature values from the normalized movement signal.

\* \* \* \* \*